(12) United States Patent
Nago (10) Patent No.: US 7,461,724 B2
(45) Date of Patent: Dec. 9, 2008

(54) DUAL-LEVER HYDRAULIC BRAKE ASSEMBLY AND METHOD OF USING THE SAME

(75) Inventor: Daisuke Nago, Osaka (JP)

(73) Assignee: Shimano Inc., Sakai, Osaka (JP)

( * ) Notice: Subject to any disclaimer, the term of this patent is extended or adjusted under 35 U.S.C. 154(b) by 134 days.

(21) Appl. No.: 11/139,139

(22) Filed: May 27, 2005

(65) Prior Publication Data

US 2006/0266595 A1    Nov. 30, 2006

(51) Int. Cl.
*B62L 3/00* (2006.01)
(52) U.S. Cl. .................. 188/24.22; 188/2 D; 60/594
(58) Field of Classification Search ............. 188/24.22, 188/2 D, 344, 151 R, 352; 60/594, 574, 575, 60/588
See application file for complete search history.

(56) References Cited

U.S. PATENT DOCUMENTS

| | | | |
|---|---|---|---|
| 1,457,156 A | * | 5/1923 | Frock .......................... 60/581 |
| 2,473,168 A | * | 6/1949 | Milster ......................... 60/581 |
| 3,803,937 A | * | 4/1974 | Johnston ...................... 74/489 |
| 4,930,798 A | | 6/1990 | Yamazaki |
| 5,094,322 A | | 3/1992 | Casillas |
| 5,299,466 A | | 4/1994 | Heilbron et al. |
| 5,678,665 A | * | 10/1997 | Debreczeni ................. 188/344 |

FOREIGN PATENT DOCUMENTS

JP    11189189 A  *  7/1999

* cited by examiner

*Primary Examiner*—Xuan Lan Nguyen
(74) *Attorney, Agent, or Firm*—Jeffer Mangels Butler & Marmaro LLP (57) ABSTRACT

A dual lever hydraulic brake assembly is described. The brake assembly comprises two levers operatively connected to a hydraulic brake system. A hydraulic assembly is also described wherein a lever is operatively connected to a master cylinder such that moving the lever in an actuating direction moves the master cylinder in a first direction.

20 Claims, 7 Drawing Sheets

FIG. 4

DUAL-LEVER HYDRAULIC BRAKE ASSEMBLY AND METHOD OF USING THE SAME

FIELD OF THE INVENTION

The present invention relates generally to hydraulic assemblies, and more particularly, to a dual lever hydraulic assembly.

BACKGROUND OF THE INVENTION

A typical hydraulic actuating device includes a master piston disposed in a master cylinder. The master piston and cylinder define a variable fluid containing volume within the master cylinder which is adjusted as the piston is moved within the master cylinder. In known systems, the master cylinder is typically disposed in a housing and remains stationary, while the position of the piston within the master cylinder is adjustable. Because only the piston position is adjustable, the flexibility of known devices is somewhat limited. Thus, a need has arisen for a hydraulic apparatus that addresses these limitations.

Hydraulic actuating devices have been used to actuate bicycle brakes. However, the limitations of such known devices have at times made braking inconvenient or difficult. When riding a bicycle, riders frequently adopt various postures. For example, when racing, riders may adopt an aerodynamic posture by leaning over to reduce wind resistance. Conversely, when riding casually, riders may adopt a relatively upright posture. However, known hydraulic brake systems only provide one lever at one location on the handlebars. As a result, a brake lever that is optimally positioned for racing may be poorly positioned for casual riding and vice-versa. This can adversely affect the rider's safety if the lever is not readily accessible from the rider's posture. Thus, a need has arisen for a brake assembly that addresses these limitations.

SUMMARY OF THE PREFERRED EMBODIMENTS

In accordance with a first aspect of the present invention, a hydraulic assembly is provided. The hydraulic assembly comprises a master cylinder and a lever operatively connected to the master cylinder. The lever is movable in an actuating direction, and moving the lever in the actuating direction causes the master cylinder to move in a first direction. In preferred embodiments, the hydraulic assembly further comprises a housing, the lever is pivotally connected to the housing, and the master cylinder is disposed in the housing. In other preferred embodiments, the master cylinder has a non-actuated position and a fully actuated position, and the master cylinder is biased towards the non-actuated position.

In further preferred embodiments, the hydraulic assembly comprises a master piston disposed in the master cylinder. In still other preferred embodiments, moving the lever in the actuating direction moves the master cylinder with respect to the master piston.

In yet other preferred embodiments, the hydraulic assembly comprises a second lever operatively connected to the master piston, wherein the master piston is disposed in the master cylinder. In additional preferred embodiments, the second lever is movable in a second actuating direction, and the movement of the lever in the second actuating direction moves the master piston with respect to the master cylinder. In still other preferred embodiments, the hydraulic assembly comprises a hydraulic brake system in fluid communication with the master cylinder. In further preferred embodiments, the hydraulic brake system is one selected from the group consisting of a hydraulic rim brake system and a hydraulic disc brake system.

In additional preferred embodiments, the lever has a non-actuated position and a fully actuated position, defining a reach between the non-actuated position and the fully actuated position, and the reach is adjustable.

In accordance with another aspect of the present invention, a hydraulic assembly is provided which comprises a housing, first and second levers pivotally connected to the housing, and a volume of hydraulic fluid contained in the housing, wherein moving the first lever in a first actuating direction displaces hydraulic fluid from the housing, and moving the second lever in a second actuating direction displaces hydraulic fluid from the housing. In preferred embodiments, a first master piston is operatively connected to the first lever, a second master piston is operatively connected to the second lever, and a master cylinder is disposed within the interior of the housing, wherein the volume of hydraulic fluid is contained in the master cylinder, moving the first lever in a first actuating direction displaces hydraulic fluid from the master cylinder, and moving the second lever in the second actuating direction displaces hydraulic fluid from the master cylinder. In other preferred embodiments, a master cylinder is operatively connected to the first lever, wherein the volume of hydraulic fluid is contained within the master cylinder, moving the first lever in the first actuating direction displaces hydraulic fluid from the master cylinder, and moving the second lever in the second actuating direction displaces hydraulic fluid from the master cylinder.

In further preferred embodiments, a master piston is operatively connected to the second lever. In still other preferred embodiments, the master cylinder and the master piston define a fluid containing region, the volume of hydraulic fluid is contained in the fluid containing region, and moving at least one selected from the master piston and the master cylinder adjusts the volume.

In still other preferred embodiments, the master piston is disposed in the master cylinder. In yet other preferred embodiments, moving the first lever in the first actuating direction moves the master cylinder in a first direction, and moving the second lever in the second actuating direction moves the master piston in a second direction. In further preferred embodiments, a hydraulic brake system is in fluid communication with the housing. In yet further preferred embodiments, the hydraulic brake system is one selected from the group consisting of a hydraulic rim brake system and a hydraulic disc brake system. In accordance with additional preferred embodiments, the hydraulic brake assembly is attached to a bicycle handlebar such that the first lever and second lever are spaced apart from one another in a direction that is substantially perpendicular to a horizontal direction defined by the handlebar width.

In accordance with a further aspect of the present invention, a brake assembly is provided which comprises first and second levers operatively connected to a hydraulic brake system. In preferred embodiments, the brake assembly comprises a master cylinder and a master piston disposed in the master cylinder, wherein the first lever is operatively connected to the master cylinder, and the second lever is operatively connected to the master piston. In additional preferred embodiments, the first lever is operatively connected to a first master piston, and the second lever is operatively connected to a second master piston.

In still other preferred embodiments, moving the first lever in a first actuating direction moves the master cylinder in a first direction. In other preferred embodiments, moving the second lever in a second actuating direction moves the master piston in a second direction. In further preferred embodiments, the hydraulic brake system is one selected from the group consisting of a hydraulic disc brake system and a hydraulic rim brake system.

In accordance with still another aspect of the present invention, a method of riding a bicycle having a brake assembly is provided. The brake assembly includes first and second levers operatively connected to a hydraulic brake system, and the method comprises actuating a selected one of the first lever and the second lever. In preferred embodiments, the method further comprises riding the bicycle on a surface while in a first position, wherein the first and second levers are spaced apart from the surface in a vertical direction with respect to the surface, the first lever is farther from the vertical surface than the second lever, and the step of actuating comprises actuating the first lever.

In other preferred embodiments, the method further comprises riding the bicycle in one selected from the group consisting of a first position and a second position, wherein the actuating step comprises actuating the first lever while in the first position and actuating the second lever while in the second position. In further preferred embodiments, the first position is an upright position, and the second position is a leaning position.

In yet a further aspect of the present invention, a hydraulic assembly is provided which comprises a master cylinder assembly containing a volume of hydraulic fluid, a first lever operatively connected to the master cylinder assembly, and a second lever operatively connected to the master cylinder assembly, wherein moving the first lever in a first actuating direction displaces hydraulic fluid from the master cylinder assembly, and moving the second lever in a second actuating direction displaces hydraulic fluid from the master cylinder assembly. In preferred embodiments, the master cylinder assembly comprises a master cylinder and a master piston. In other preferred embodiments, the master cylinder and the master piston define a fluid containing region, and the volume of hydraulic fluid is contained in the fluid containing region.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
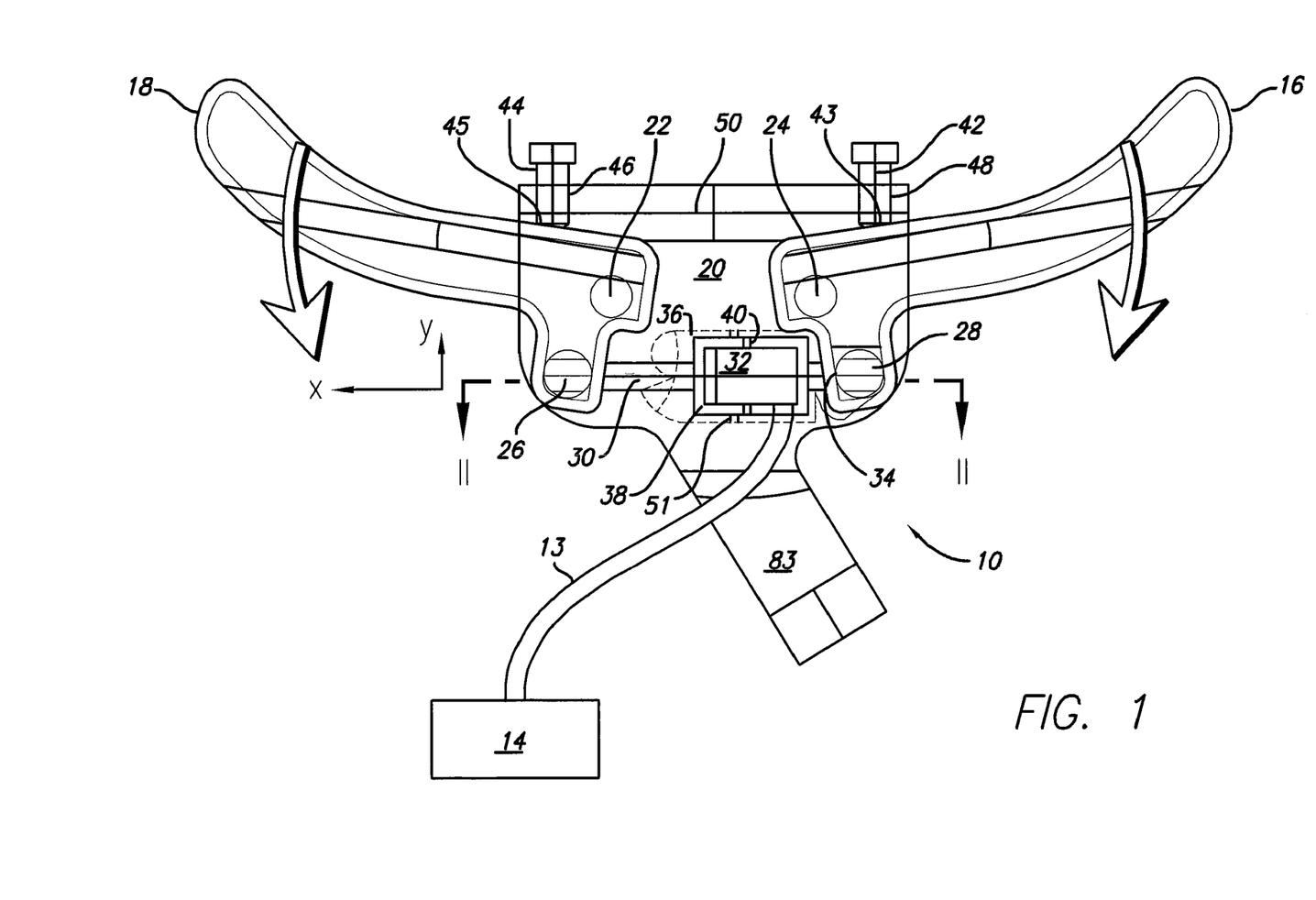
FIG. 1 is a side elevational view of a hydraulic assembly in accordance with a preferred embodiment of the present invention in which the interior of the assembly housing is visible.

Referring to FIG. 1, a hydraulic assembly 10 in accordance with a preferred embodiment of the present invention is described. Hydraulic assembly 10 is preferably connected to a hydraulic brake system 14, such as a known hydraulic disc brake or hydraulic rim brake system.

Hydraulic assembly 10 preferably comprises a housing 20, a first lever 16, and a second lever 18. Housing 20, and levers 16 and 18 are preferably made of durable materials such as known metals or plastics.

Levers 16 and 18 are pivotally connected to housing 20 and are actuatable to displace hydraulic fluid from housing 20 to hydraulic disc brake system 14. In the preferred embodiment of FIG. 1, first lever 16 is operatively connected to a master cylinder 38. Master cylinder 38 generally comprises a cylindrical chamber which contains a variable volume of hydraulic fluid used to actuate an attached hydraulic system, such as hydraulic brake system 14.

In the embodiment of FIG. 1, first lever 16 is pivotally connected to housing 20 via a pivot shaft 24. In FIG. 1, the interior of housing 20 is visible. Thus, as the figure indicates, housing 20 is preferably designed to enclose a portion of lever 16 in its interior. Pivot shaft 24 is preferably made of a suitable metal or plastic. Housing 20 preferably includes a pair of holes (not shown), each of which is formed on one side of housing 20 for mounting pivot shaft 24. Lever 16 also preferably has a pair of holes (not shown), each of which is formed on either side of lever 16. Thus, pivot shaft 24 is inserted through the housing holes and lever holes to secure lever 16 to housing 20.

Pivot shaft 24 may include flanged ends which aid in retaining shaft 24 within the housing. Pivot shaft 24 may also comprise two pieces, each of which is inserted through a corresponding hole in housing 20 and lever 16 and then mated with one another by known techniques such as a threaded connection.

Lever 16 preferably has a non-actuated position and a fully-actuated position (not shown). In FIG. 1, lever 16 appears in its non-actuated position. Lever 16 is operatively connected to master cylinder 38 such that when it is moved in the direction of the arrow shown in the figure, master cylinder 38 moves towards lever 18. Eventually lever 16 reaches its fully actuated position, beyond which it cannot be pulled any further.

Figure 1A:
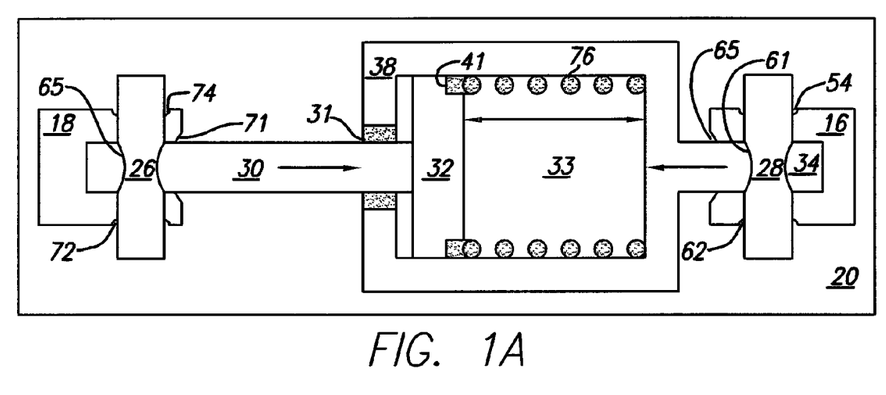
FIG. 1A is a first preferred embodiment of a portion of a hydraulic assembly with a master piston and master cylinder in non-actuated positions, illustrated as a cross-sectional view taken along line II-II of FIG. 1.
Figure 1B:
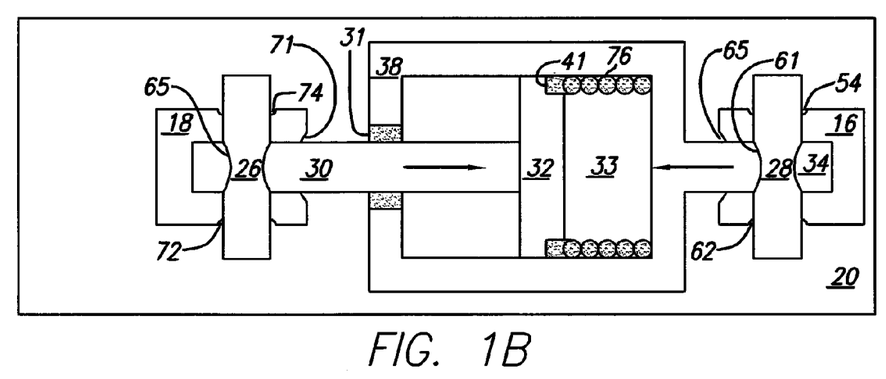
FIG. 1B is a view of the hydraulic assembly portion of FIG. 1A with the master piston in an actuated position and the master cylinder in a non-actuated position.
Figure 1C:
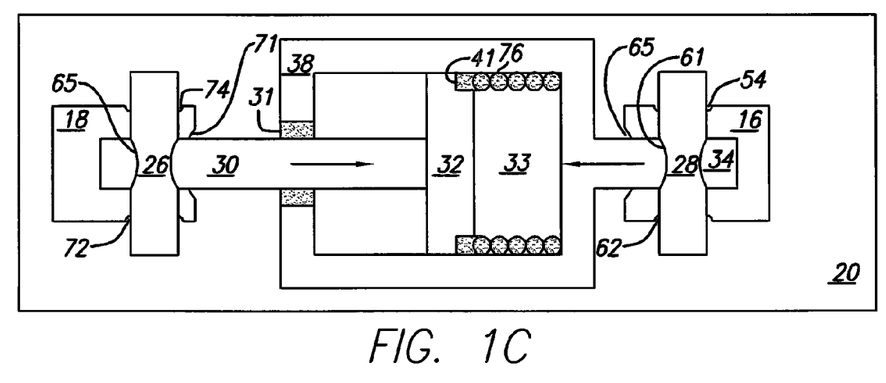
FIG. 1C is a view of the hydraulic assembly portion of FIG. 1A with the master piston in a non-actuated position and the master cylinder in an actuated position.

Referring to FIGS. 1A-1C, a first preferred embodiment of a portion of a hydraulic assembly as viewed along line II-II in FIG. 1 is described. In accordance with this preferred embodiment, lever 16 is operatively connected to master cylinder 38 by connector 34, which is preferably a shaft that is removably or fixedly attached to one end of master cylinder 38. Connector 34 may be secured to master cylinder 38 using known techniques. For example, it may be welded to the end of master cylinder 38, it may be integrally formed with master cylinder 38, or it may include a threaded end which engages a complementary threaded recess or hole formed in master cylinder 38. If a threaded hole is used, it is preferred that a sealing device or sealant is used to prevent any leakage from the end of master cylinder 38 to which connector 34 is attached.

Lever 16 preferably includes oppositely positioned holes 54 and 62 for securing connector 34 to lever 16. To better ensure uniform operation, lever 16 is also preferably configured such that master cylinder 38 does not move in the direction of the y-axis shown in FIG. 1 as lever 16 is actuated, but instead moves in a direction that is substantially parallel to the x-axis.

A preferred embodiment of the connection between lever 16 and connector 34 is also provided in FIGS. 1A to 1C. According to the figures, connector 34 is inserted through hole 65 formed in a face of lever 16 which is opposite master cylinder 38. A cross-member 28, such as a dowel, pin or other suitable fastener is preferably disposed through lever holes 54 and 62. Cross-member 28 preferably includes a hole 61 formed transversely to its longitudinal axis through which connector 34 is disposed. Alternatively, and as reflected in the embodiment of FIGS. 2A-2B (discussed below), connector 34 may include a hole transverse to its longitudinal axis through which cross-member 28 is disposed. Although not shown in FIGS. 1A-1C, cross-member 28 may include enlarged ends, such as flanged ends, to aid in securing cross-member 28 within lever holes 54 and 62. To better ensure that master cylinder 38 moves in a direction that is parallel to the x-axis, hole 65, holes 54 and 62, and cross-member 28 are preferably sized to allow lever 16 to pivot slightly with respect to connector 34 as lever 16 is actuated. For example, hole 65 may have a diameter that is slightly larger than the outer diameter of connector 34, and holes 54 and 62 may have diameters slightly larger than the outer diameter of cross-member 28.

As shown in FIGS. 1 and 1A-1C, lever 18 is operatively connected to master piston 32. Master piston 32 is preferably disposed in and slideable within master cylinder 38. Lever 18 is partially disposed within the interior of housing 20 and pivotally connected to housing 20 via pivot shaft 22 in the same manner that lever 16 is connected to housing 20 via pivot shaft 24. Like lever 16, lever 18 has a non-actuated position, shown in FIG. 1, and a fully actuated position (not shown in FIG. 1) in which the lever is moved in the direction of the arrow shown in the figure. Lever 18 is operatively connected to master piston 32 via piston shaft 30. The operative connection between lever 18 and master piston 32 is preferably designed to move master piston 32 in a direction towards lever 16 as lever 18 is actuated in the direction of the arrow. To better ensure uniform operation, the connection between master piston 32 and lever 18 is preferably configured such that master piston 32 moves in a direction that is substantially parallel to the x-axis shown in FIG. 1 as lever 18 is actuated while avoiding movement in the direction of the y-axis.

Referring to FIGS. 1A-1C, shaft 30 has an end that is disposed through a hole 31 formed in one end of master cylinder 38. Hole 31 preferably includes a gasket (not shown) or other sealing means to prevent leakage of fluids between master cylinder 38 and the interior of housing 20.

Opposite master cylinder 38, shaft 30 preferably includes an end that is disposed through hole 71 in a face of lever 18. Cross-member 26 is preferably disposed through holes 72 and 74 formed in lever 18. Although not shown in FIGS. 1A-1C, cross member 26 may include enlarged ends, such as flanged ends, to aid in securing cross member 26 within holes 72 and 74. Hole 65 is preferably formed through cross-member 26 for receiving shaft 30. However, as explained below with respect to FIGS. 2A-2B, instead of inserting shaft 30 through a hole in cross-member 26, the opposite arrangement can be used wherein cross-member 26 is inserted through a hole in shaft 30.

To better ensure that piston 32 moves in a direction substantially parallel to the x-axis as lever 18 is actuated, holes 71, 72 and 74 are preferably sized to allow lever 18 to pivot slightly about shaft 30 as lever 18 is actuated. For example, hole 71 may have a diameter that is slightly larger than the outer diameter of shaft 30, and holes 72 and 74 may have diameters that are slightly larger than the diameter of the non-flanged portion of shaft 26.

Piston 32 is preferably configured to slide along the interior of master cylinder 38 and to prevent the leakage of hydraulic fluid into the region near shaft 30 and hole 31. To aid in preventing leakage, O-ring 41 is preferably provided and disposed in a complementary groove formed around piston 32.

As shown in FIGS. 1A-1C, master cylinder 38 and master piston 32 define a fluid containing region 33 which contains a volume of hydraulic fluid. The hydraulic fluid is used to actuate an attached hydraulic system, such as brake system 14 (FIG. 1). Master cylinder 38 also includes a fluid outlet 39 (not shown in FIGS. 1A-1C) which may be attached to fluid conduit 13 to connect hydraulic assembly 10 to hydraulic brake system 14. Hydraulic brake system 14 may be any known system that is actuated hydraulically, but is preferably a hydraulic disc or rim brake system. In known hydraulic disc and rim brake systems, slave pistons are connected to brake pads which impinge on a brake rotor (disc brake) or wheel rim (rim brakes) to effect braking. As fluid is displaced from master cylinder 38, it increases the system hydraulic pressure in the brake system 14, conduit 13 and fluid containing region 33, thereby forcing the slave pistons and brake pads of hydraulic brake system 14 towards the brake rotor (in the case of disc brakes) or wheel rim (in the case of rim brakes).

In the preferred embodiment of FIGS. 1A-1C, master cylinder 38 floats freely within the interior of housing 20, being supported axially by its connection to lever 16 and radially by master piston 32. Referring to FIG. 1A, levers 16 and 18 and master cylinder 38 and master piston 32 are in their non-actuated positions. As shown in FIG. 1B, as lever 18 is actuated (i.e., pulled in the direction of the arrow shown in FIG. 1), the portion of lever 18 proximate shaft 30 moves with respect to housing 20, and master piston 32 moves towards lever 16 and the bottom of master cylinder 38. As a result, the volume of fluid containing region 33 is decreased, forcing fluid out of master cylinder 38 and to an attached hydraulic brake system 14 (FIG. 1). As shown in FIG. 1C, when lever 16 is actuated (i.e., pulled in the direction of the arrow shown in FIG. 1), lever 16 moves with respect to housing 20, and master cylinder 38 moves toward lever 18. As a result the volume of hydraulic fluid in fluid containing region 33 is decreased, again forcing fluid out of master cylinder 38 and to an attached hydraulic brake system 14 (FIG. 1).

As will be readily apparent to those skilled in the art, the movement of master cylinder 38 and master piston 32 with respect to one another adjusts the volume of fluid containing region 33. Thus, the volume of fluid containing region 33 can be adjusted by moving master piston 32, by moving the master cylinder 38, or by moving both master cylinder 38 and master piston 32. In accordance with the embodiments of FIGS. 1 and 1A-1C, either or both of lever 16 or lever 18 can be used to actuate brake system 14.

Because both master cylinder 38 and master piston 32 are movable with respect to housing 20, housing 20 is preferably designed to accommodate the movement of conduit 13 (FIG. 1) as master cylinder 38 moves. In a preferred embodiment, housing 20 includes a longitudinal slot oriented along the axis of movement of master cylinder 38 to allow conduit 13 to move along housing 20 as master cylinder 38 is actuated.

As depicted in FIGS. 1 and 1A, master cylinder 38 and master piston 32 are in their non-actuated positions. Fluid containing region 33, conduit 13, and brake system 14 are preferably configured such that the brakes are not applied when master cylinder 38 and master piston 32 are in their non-actuated positions. Thus, in the case of a disc brake system, the brake pads are preferably spaced apart from the rotor, while in the case of a rim brake system the brake pads are preferably spaced apart from the wheel rim.

To avoid unwanted braking, it is preferable to maintain master piston 32 and master cylinder 38 in their respective non-actuated positions when levers 16 and 18 are not being actuated. In one preferred embodiment, master piston 32 and master cylinder 38 are biased using known techniques. Referring to FIGS. 1A-1C, a biasing spring 76 is provided. Biasing spring is preferably disposed in fluid containing region 33 to bias master piston 32 and master cylinder 38 towards their respective non-actuated positions. Because of the operative connection between lever 16 and master cylinder 38, biasing spring 76 also biases lever 16 towards its non-actuated position. Similarly, by biasing master piston 32 towards its non-actuated position, biasing spring 76 biases lever 18 towards its non-actuated position. As indicated in FIGS. 1B and 1C, the actuation of lever 16 and/or lever 18 compresses spring 76. Thus, the actuating force applied to either lever must be sufficient to overcome the resistance of spring 76. Spring 76 is preferably selected such that its spring constant is sufficient to bias master piston 32 and master cylinder 38 toward their respective non-actuated positions, while allowing levers 16 and 18 to be actuated by riders of normal gripping strength.

Figure 2A:
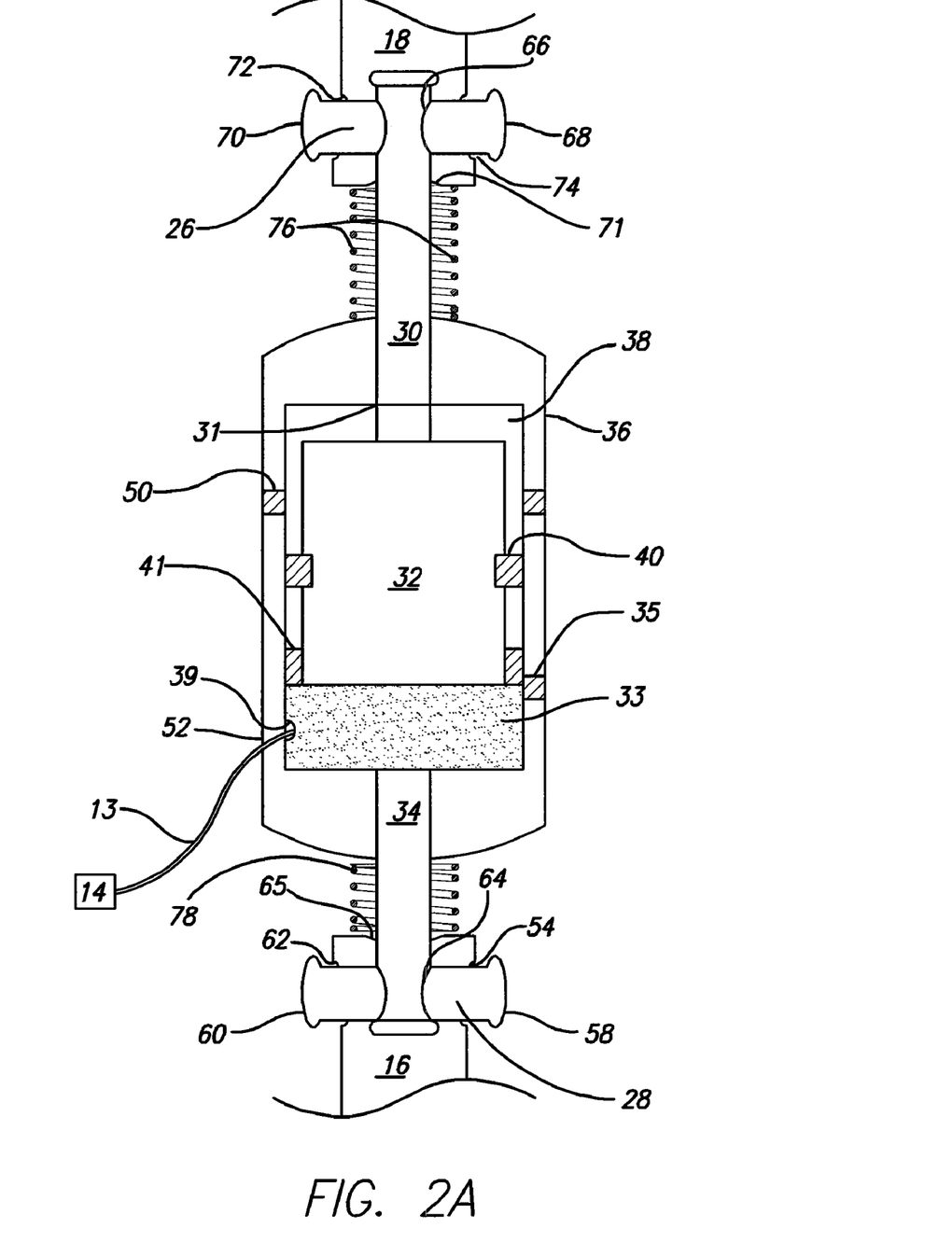
FIG. 2A is a second preferred embodiment of a portion of a hydraulic assembly with a master piston and a master cylinder in non-actuated positions, illustrated as a cross-sectional view taken along line II-II of FIG. 1 and showing two biasing springs.

Referring to FIG. 2A, a second preferred embodiment of a portion of a hydraulic assembly in accordance with the present invention will now be described. As with the previous preferred embodiment, the second preferred embodiment is illustrated as a cross-section taken along line II-II in FIG. 1. As shown in FIG. 2A, lever 16 is operatively connected to master cylinder 38 via connector 34, which is preferably a shaft that is removably or fixedly attached to master cylinder 38. Again, connector 34 may be secured to master cylinder 38 using known techniques such as welding, threaded engagement, or by integrally forming connector 34 with master cylinder 38.

As best shown in FIG. 2A, lever 16 preferably includes oppositely positioned holes 54 and 62 for securing connector 34 to lever 16. To better ensure uniform operation, lever 16 is also preferably configured such that master cylinder 38 does not move in the direction of the y-axis shown in FIG. 1 as lever 16 is actuated, but instead moves in a direction that is substantially parallel to the x-axis.

A preferred embodiment of the connection between lever 16 and connector 34 is also illustrated in FIG. 2A. According to the figure, connector 34 is inserted through hole 65 formed in a face of lever 16 which is opposite master cylinder 38. Connector 34 is preferably formed with a through hole 64 at its end opposite the end secured to master cylinder 38. A cross-member 28, such as a dowel, pin or other suitable fastener is preferably disposed through lever holes 54 and 62 and connector hole 64. As shown in the figure, the ends 58 and 60 of cross-member 28 may be flanged to aid in securing cross-member 28 within lever holes 54 and 62. Also, cross-member 28 may comprise two pieces which are separately inserted through opposite sides of lever 16 and then connected using known means, such as threaded engagement. To better ensure that master cylinder 38 moves in a direction that is parallel to the x-axis, hole 65, holes 54 and 62, and cross-member 28 are preferably sized to allow lever 16 to pivot slightly with respect to connector 34 as lever 16 is actuated. For example, hole 65 may have a diameter that is slightly larger than the outer diameter of connector 34, and holes 54 and 62 may have diameters slightly larger than the outer diameter of the non-flanged portion of cross-member 28.

Master cylinder 38 may float freely within the interior of housing 20, without being directly connected to the interior of housing 20. However, it may be desirable to provide an external radial support for master cylinder 38 to better ensure the uniformity of its movement within housing 20. For example, housing 20 may be configured to include a support structure 36. In one embodiment, housing 20 comprises a solid middle portion, and support structure 36 is a journaled section within the solid middle portion. In another embodiment, support structure 36 comprises an additional cylindrical structure that is fixedly attached to the interior of housing 20. In either embodiment, support structure 36 is preferably cylindrical in shape with a diameter that is slightly larger than that of master cylinder 38. To provide further support, an O-ring 51 is preferably attached to the outer circumference of master cylinder 38 so that master cylinder 38 is radially supported by and slidable with respect to support structure 36. Also, if a relatively tight fit is desired between master cylinder 38 and the inner walls of journaled section 36, an anti-friction coating or lubricant may be applied to the exterior of master cylinder 38 and/or the walls of support structure 36 to facilitate sliding movement of master cylinder 38 along the support structure's interior walls.

As with the previous embodiment, lever 18 is operatively connected to master piston 32, and lever 16 is operatively connected to master cylinder 38. Levers 16 and 18 are also partially disposed within and pivotally connected to housing 20 in the manner described previously. When lever 16 is moved in the direction of the arrow shown in FIG. 1, master cylinder 38 moves with respect to housing 20 and support structure 36 (if provided) in a direction towards lever 18. When lever 18 is moved in the direction of the arrow shown in FIG. 1, master piston 32 moves with respect to housing 20 and support structure 36 (if provided) in a direction towards lever 16.

Referring to FIG. 2A, lever 18 is operatively connected to master piston 32 via shaft 30. Shaft 30 has an end that is disposed through a hole 31 formed in one end of master cylinder 38. Hole 31 preferably includes a gasket (not shown) or other sealing means to prevent leakage of fluids between master cylinder 38 and the interior of housing 20.

Opposite master cylinder 38, shaft 30 preferably includes an end that is disposed through a hole 71 in a face of lever 18.

As shown in FIG. 2A, shaft 30 includes a through-hole 66 trough which cross-member 26 is inserted. Cross-member 26 may be a dowel, pin, or other suitable fastener and may include flanged ends 68 and 70 to aid in retaining it within lever 16. As with cross-member 28, cross-member 26 may comprise two pieces which are first inserted through lever holes 72 and 74 and shaft hole 66 and then mated using known techniques such as threaded engagement.

To better ensure that piston 32 moves in a direction substantially parallel to the x-axis (FIG. 1) as lever 18 is actuated, holes 71, 72 and 74 are preferably sized to allow lever 18 to pivot slightly about shaft 30 as lever 18 is actuated. For example, hole 71 may have a diameter that is slightly larger than the outer diameter of shaft 30, and holes 72 and 74 may have diameters that are slightly larger than the diameter of the non-flanged portion of shaft 26.

Piston 32 is preferably configured to slide along the interior of master cylinder 38 and to prevent the leakage of hydraulic fluid into the region near shaft 30 and hole 31. Thus, in the preferred embodiment of FIG. 2A, O-rings 40 and 41 are disposed about the outer surface of master cylinder 38. O-rings 40 and 41 are preferably comprised of a known rubber material which has suitable frictional properties to provide sliding engagement with master cylinder 38 will still performing their sealing function.

As shown in FIG. 2A, master cylinder 38 and master piston 32 define a fluid containing region 33 which contains a volume of hydraulic fluid. The hydraulic fluid is used to actuate an attached hydraulic system, such as brake system 14. Master cylinder 38 also includes a fluid outlet 39 which may be attached to fluid conduit 13 to connect hydraulic assembly 10 to hydraulic brake system 14. Hydraulic brake system 14 may be any known system that is actuated hydraulically, but is preferably a hydraulic disc or rim brake system.

If support structure 36 is provided, it is preferably configured to allow conduit 13 to move freely along with master cylinder 38. In an exemplary embodiment, support structure 36 may include a longitudinal slot (not shown) oriented in the direction of travel of master cylinder 38. In this exemplary embodiment, conduit 13 is disposed through the longitudinal slot and moves freely along the slot as master cylinder 38 moves. Housing 20 may also include an aligned longitudinal slot to allow conduit 13 to move freely with respect to housing 20 as master cylinder 38 moves.

As will be readily apparent to those skilled in the art, the movement of master cylinder 38 and master piston 32 with respect to one another adjusts the volume of fluid containing region 33. Thus, as with the previous preferred embodiment, the volume of region 33 can be adjusted by moving master piston 32, by moving the master cylinder 38, or by moving both master cylinder 38 and master piston 32.

As with the preferred embodiment of FIGS. 1A-1C, in the hydraulic assembly of this preferred embodiment either or both of lever 16 or lever 18 can be used to actuate brake system 14. As lever 16 is actuated in the direction of the arrow shown in FIG. 1, master cylinder 38 will move towards lever 18, thereby decreasing the volume of fluid containing region 33 and forcing hydraulic fluid contained in region 33 through outlet 39 and toward brake system 14. Similarly, as lever 18 is moved in the direction of the arrow shown in FIG. 1, master piston 32 will move towards lever 16 and the bottom of master cylinder 38. As master piston 32 moves towards the bottom of master cylinder 38, the volume of region 33 will decrease, forcing hydraulic fluid contained therein through outlet 39 and to attached brake system 14. Thus, this preferred embodiment also provides a hydraulic assembly with two separate levers, each of which can be used to actuate an attached hydraulic brake system. The dual lever structure allows a vehicle rider to select the lever that is most readily accessible based on the rider's posture.

In accordance with the second preferred embodiment, it is preferable to maintain master piston 32 and master cylinder 38 in their respective non-actuated positions when levers 16 and 18 are not being actuated. Thus, master piston 32 and master cylinder 38 are preferably biased using known techniques. For example, if support structure 36 is used as shown in FIG. 2A, a biasing spring 76 may be disposed about shaft 30 such that it engages lever 18 on one end and support structure 36 on the other end. If support structure 36 is a fixed cylindrical structure with a partially closed end proximate lever 18, spring 76 could be configured to engage the partially closed end and bias lever 18 away from support structure 36. Because of the operative connection between lever 18 and master piston 32, this would have the effect of biasing master piston 32 towards its non-actuated position.

To bias master cylinder 38 towards its non-actuated position, spring 78 is preferably disposed about connector 34 and engages lever 16 and support structure 36. Again, if support structure 36 is a fixed cylinder with a partially-closed end proximate lever 16, spring 78 could be configured to engage the partially-closed end. Because of the operative connection of lever 16 and master cylinder 38, spring 78 will bias master cylinder 38 and lever 16 towards their respective non-actuated positions. Thus, in accordance with this embodiment, lever 16, lever 18, master piston 32, and master cylinder 38 are each biased towards their respective non-actuated positions.

If biasing is desired, it can also be accomplished using a biasing device that acts directly against the levers 16 and 18 and housing 20. In an exemplary embodiment, torsion springs may be disposed about pivot shafts 26 and 28 such that one leg of each spring abuts one of the levers 16 and 18 and the other leg abuts a corresponding portion of housing 20. This configuration will to apply a force against levers 16 and 18 in the direction of their non-actuated positions. Of course, as one of ordinary skill in the art would readily appreciate, levers 16 and 18 and housing 20 must be configured appropriately to provide the necessary connections between the legs of the torsion spring and the levers 16 and 18 and housing 20.

Figure 2B:
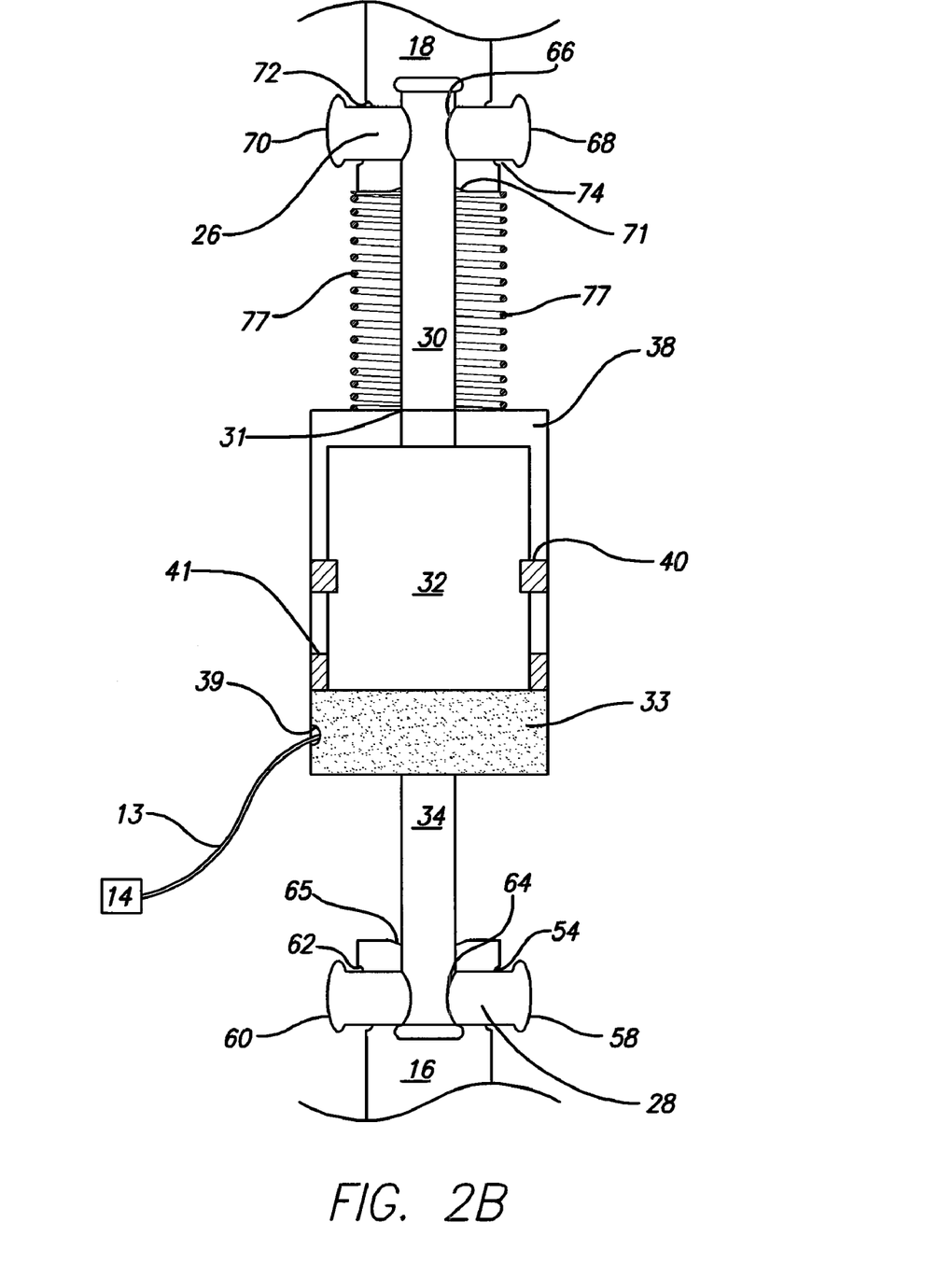
FIG. 2B is a cross-sectional view taken along line II-II of FIG. 1 similar to FIG. 2A, but with the support structure omitted and showing a single biasing spring.

Referring to FIG. 2B, support structure 36 of the second preferred embodiment may be excluded, leaving master cylinder 38 supported axially by connector 34 and radially by master piston 32. If support structure 36 is excluded, biasing is preferably accomplished with a single spring 77 instead of springs 76 and 78. Spring 77 is preferably disposed about shaft 30 such that one end abuts lever 18 and the other end abuts master cylinder 38. Again, because of the operative connections between lever 18 and master piston 32 and between lever 16 and master cylinder 38, spring 77 will bias levers 16 and 18 toward their non-actuated positions along with master piston 32 and master cylinder 38. One benefit of this configuration versus the embodiment of FIGS. 1A-1C is that the biasing spring is not located in fluid containing region 33, thereby improving ease of access to the spring.

Although not depicted in the figures, housing 20 is preferably designed to allow the ready addition and removal of hydraulic fluid to and from master cylinder 38. For example, master cylinder 38 may include a port 35 for adding or removing fluid. If port 35 is provided, housing 20 should preferably be configured to allow access to the port. For example, housing top portion 50 may be removable to provide access to master cylinder 38. Also, if support structure 36 is used, it preferably includes a port or similar structure which can be connected to port 35.

In an optional embodiment, a structure may be included for storing hydraulic fluid. In one such embodiment, a reservoir is provided either internally or externally of housing 20 for storing hydraulic fluid. Alternatively, hydraulic conduit 13 may be removed from brake system 14 and used to add fluid to or remove fluid from master cylinder 38.

Figure 2C:
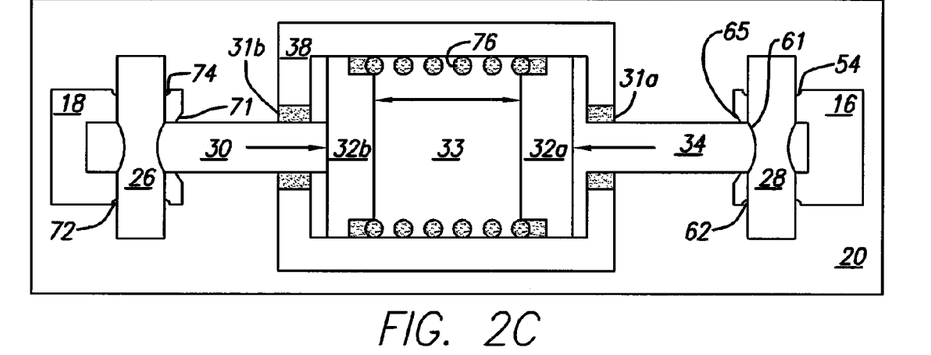
FIG. 2C is a third preferred embodiment of a portion of a hydraulic assembly with first and second master pistons in non-actuated positions, illustrated as a cross-sectional view taken along lines II-II of FIG. 1.
Figure 2D:
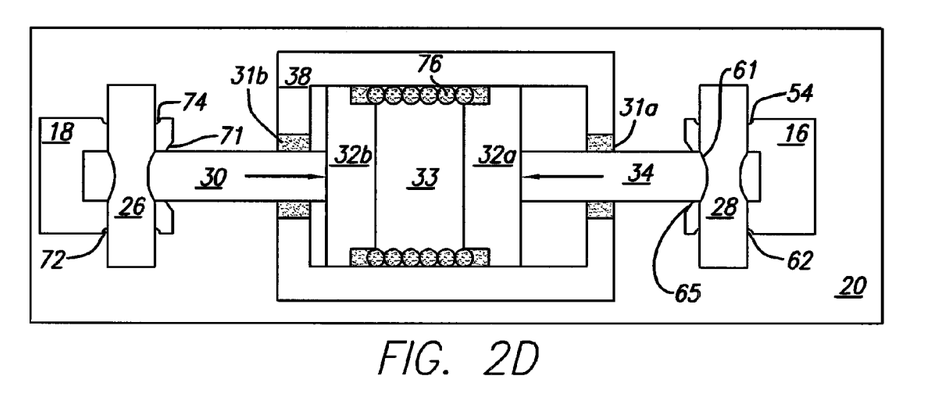
FIG. 2D is a view of the hydraulic assembly portion of FIG. 2C with the first master piston in an actuated position and the second master piston in a non-actuated position.
Figure 2E:
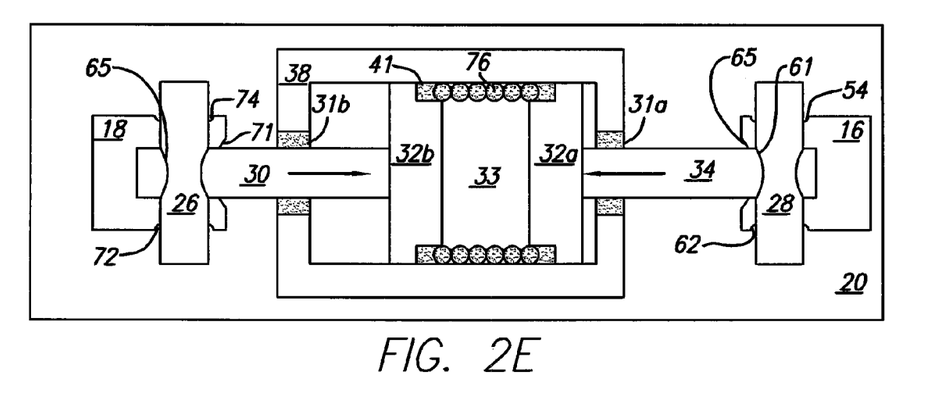
FIG. 2E is a view of the hydraulic assembly portion of FIG. 2C with the first master piston in a non-actuated position and the second master piston in an actuated position.

A third preferred embodiment of a portion of a hydraulic assembly is depicted in FIGS. 2C-2E. As with the previous embodiments, the hydraulic assembly of this preferred embodiment is illustrated as a cross-sectional view taken along lines II-II in FIG. 1. In accordance with the third preferred embodiment, lever 18 is again operatively connected to a master piston 32b in the manner described above with respect to FIGS. 1A-1C. Thus, the connections between cross-member 26, lever 18, and shaft 30 are preferably the same as those described previously.

Unlike the previous preferred embodiments, in this third preferred embodiment lever 16 is operatively connected to master piston 32a instead of master cylinder 38. Master piston 32a is operatively connected to lever 16 via shaft 34 and cross-member 28. Master cylinder 38 includes an opening 31a through which shaft 34 is movably disposed to allow master piston 32a to move within master cylinder 38. Cross-member 28, lever 16, and shaft 34 are preferably connected in the same manner as cross-member 26, lever 18, and shaft 30. It is preferred that master cylinder 38 is freely movable and capable of floating freely along the direction of its longitudinal axis without being directly connected to housing 20. However, if desired, master cylinder 38 may be directly attached to the interior of housing 20.

To prevent unwanted braking, it is preferred to bias master pistons 32a and 32b towards their non-actuated positions, which are shown in FIG. 2C. Thus, biasing device 76, which is preferably a spring, is provided. Spring 76 is preferably located within master cylinder 38 between master piston 32a and 32b such that it biases master pistons 32a and 32b away from one another. Because of their respective operative connections to lever 16 and lever 18, this biasing also has the effect of biasing levers 16 and 18 towards their respective non-actuated positions.

In accordance with this third preferred embodiment, master pistons 32a and 32b define a fluid containing region 33 lying between master pistons 32a and 32b and within master cylinder 38. As master piston 32a moves towards lever 18 and/or master piston 32b moves towards lever 16, the volume of fluid containing region 33 will decrease, thereby forcing hydraulic fluid out of master cylinder 38 and toward hydraulic brake system 14. As illustrated in FIGS. 2A-2C, fluid containing region 33 moves with respect to master cylinder 38 as either master piston 32a or 32b is actuated. In order to transmit fluid to hydraulic brake system 14, master cylinder 38 preferably includes a fluid outlet 39 (not shown in FIGS. 2C-2E). The hydraulic assembly is preferably designed such that fluid outlet 39 remains in fluid communication with fluid containing region 33 at all times. Thus, it is preferred to locate outlet 39 at a location along the longitudinal axis of master cylinder 38 which lies within fluid containing region 33 when either master piston is in its fully actuated position. Accordingly, there is preferably a common area along the longitudinal axis of master cylinder 38 which is encompassed by fluid containing region 33 at all times (i.e., regardless of which lever 16 or 18 is being actuated).

Referring again to FIG. 1, levers 16 and 18 preferably have an adjustable reach. As used herein, "reach" refers to the range of travel of the levers 16 and 18 from their non-actuated positions to their fully actuated positions. In accordance with this preferred embodiment, adjustment screws 42 and 44 are provided. Adjustment screws 42 and 44 are preferably threadably engaged with complementary threaded through-holes 46 and 48 formed in housing top section 50. As shown in the figure, adjustment screws 42 and 44 preferably have free ends 43 and 45 which engage surfaces of levers 16 and 18 to alter the non-actuated position of each lever. In one preferred embodiment, free ends 43 and 45 are relatively flat and abuttingly engage the respective surfaces of levers 16 and 18. As screws 42 and 44 are rotated in one direction, free ends 43 and 45 push down on corresponding levers 16 and 18, causing levers 16 and 18 to pivot about their respective pivot shafts 24 and 22, thereby changing the levers' non-actuated positions. In another preferred embodiment, levers 16 and 18 may include complementary recesses (not shown) which engage free ends 43 and 45 to provide a more secure connection between adjusting screws 42 and 44 and levers 16 and 18.

Figure 3:
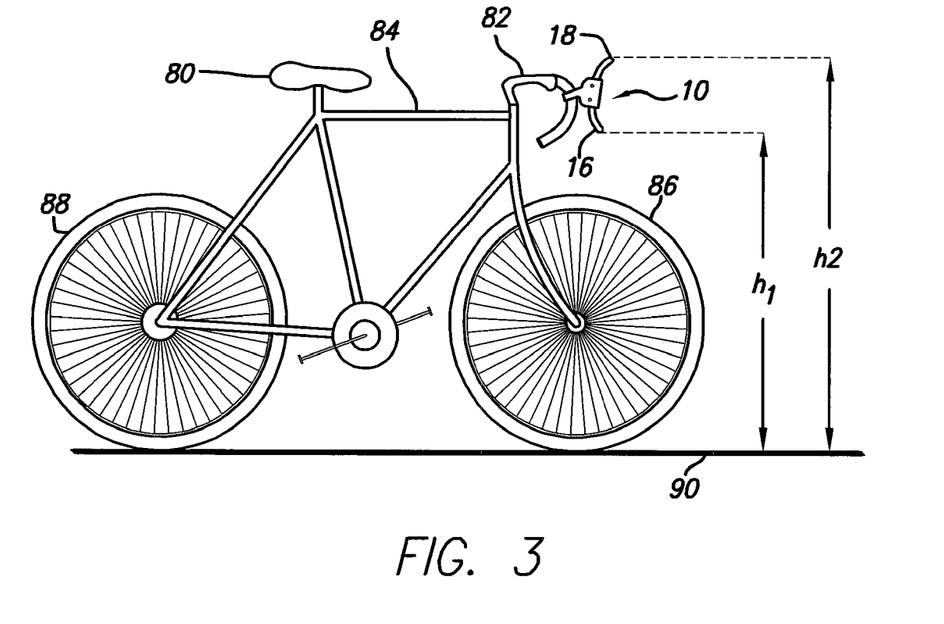
FIG. 3 is a side elevational view of a bicycle used to illustrate a preferred embodiment of the present invention.
Figure 4:
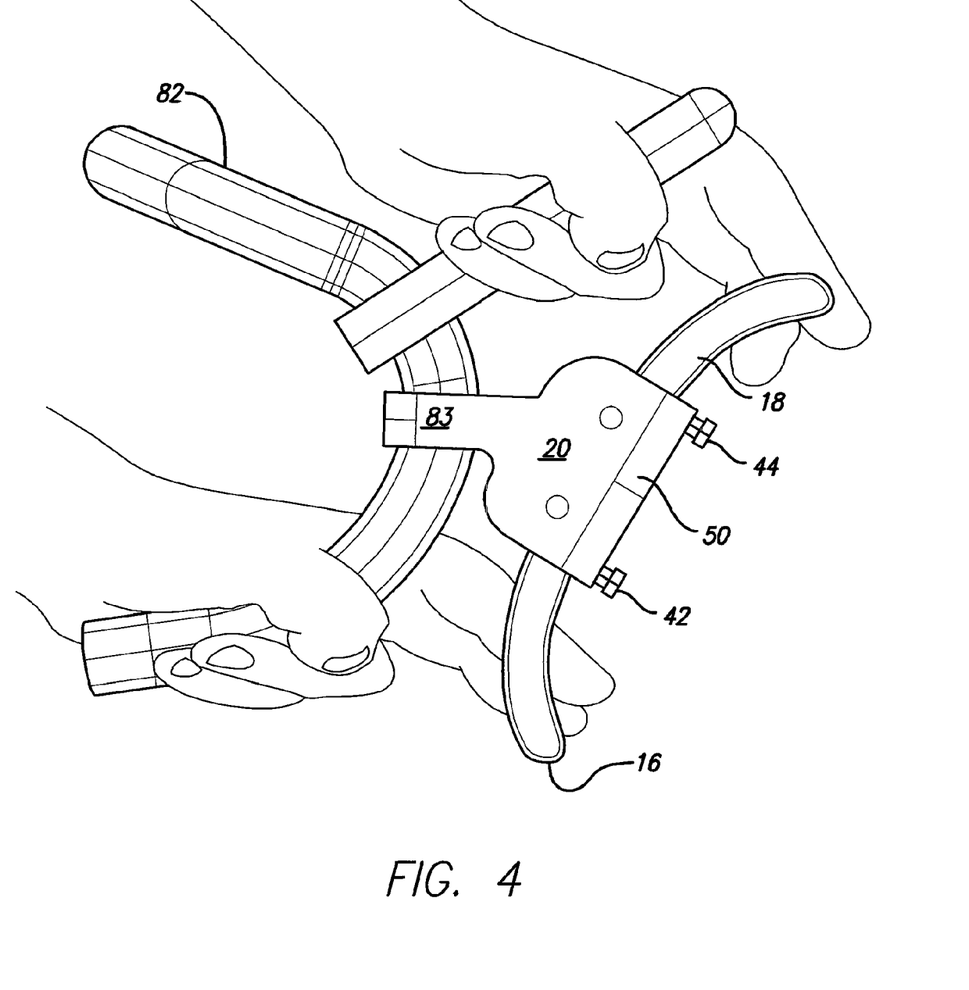
FIG. 4 is a side elevational view of the hydraulic assembly of FIG. 1 in which a preferred embodiment of a method of using the assembly is illustrated.
Figure 5:
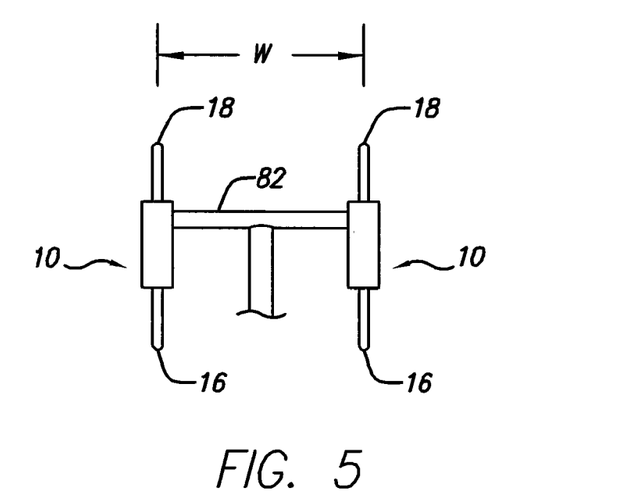
FIG. 5 is a front elevational view of a bicycle handlebar used to illustrate a preferred embodiment of the present invention.

As indicated above, the preferred embodiments of hydraulic assemblies described in FIGS. 1, 1A-1C, and 2A-2E provide for dual lever actuation of a hydraulic brake system. In a preferred embodiment, depicted in FIGS. 3-5, hydraulic assembly 10 is connected to a bicycle and to a hydraulic brake system 14 (not shown in the FIGS. 3-5). Bicycle 80 generally comprises a handlebar 82 connected to frame 84. Frame 84 is connected to front wheel 86 and rear wheel 88. Hydraulic assembly 10 preferably includes bracket 83 which is connected to handlebar 82. In an especially preferred embodiment, hydraulic assembly 10 is oriented such that levers 16 and 18 are generally perpendicular to width W of handlebar 82 (FIG. 5). As shown in FIG. 3, when hydraulic assembly 10 is oriented in this manner, lever 16 is located at a vertical distance h1 from a riding surface 90, and lever 18 is located at a vertical distance h2 from riding surface 90, wherein h2 is greater than h1. If hydraulic assembly 10 is configured according to the preferred embodiments of FIGS. 1A-1C or FIGS. 2A-2B, it is preferred to orient hydraulic assembly 10 such that master piston 32 is vertically higher than master cylinder connector 34 because the reverse orientation would place fluid containing region 33 above piston 32, increasing the likelihood of fluid leakage around piston 32. It is also preferable to position hydraulic assembly 10 such that the longitudinal axis of master cylinder 38 is substantially perpendicular to surface 90. This orientation better ensures that fluid level variations will not occur and minimizes the likelihood of unwanted variations in fluid flow to attached brake system 14.

In an especially preferred embodiment, depicted in FIG. 5, two hydraulic assemblies 10 are each connected to handlebar 82 via their respective brackets 83. The hydraulic assemblies 10 are preferably spaced apart by a distance that is about the same as the width W of handlebar 82. If two hydraulic assemblies 10 are used, their respective master cylinders 38 are preferably each connected to a conduit 13 (FIG. 1). The respective conduits 13 are preferably connected to a common conduit (not shown) which is then connected to an attached brake system 14 (FIG. 1), thereby enabling either hydraulic assembly 10 to supply fluid to brake system 14. The use of two hydraulic assemblies 10 allows the rider to effect braking using his or her right or left hand, as desired.

A method of riding a bicycle using hydraulic assembly 10 in accordance with the present invention will now be described. As is known to those skilled in the art, competitive bicyclists frequently assume a posture wherein they lean over handlebar 82. This leaning posture reduces the wind resistance of the rider's body by decreasing the body surface area which is exposed orthogonally to the direction of travel. In contrast, while riding casually in a non-competitive mode, riders will frequently assume a relatively upright posture. Because of the differing postures, a brake lever that is optimally positioned for one posture may be poorly positioned for another. Thus, in accordance with this preferred embodiment, when riding bicycle 80 in the leaning position, a rider applies the brakes by actuating lever 16. However, when riding in the upright position, the rider preferably actuates lever 18 to apply the brakes. Thus, the method allows the rider to selectively use the lever that is most accessible, thereby minimizing the need to make sudden postural changes to apply the brakes.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A hydraulic assembly, comprising:
   a cylinder;
   a first lever operatively connected to the cylinder; and
   a second lever operatively connected to a piston, wherein the piston is disposed in the cylinder, and wherein the cylinder and piston cooperate to define a fluid containing region having a fluid outlet;
   wherein the first lever is movable in a first actuating direction, and the movement of the first lever in the first actuating direction moves the cylinder with respect to the piston, thereby forcing fluid through the fluid outlet;
   wherein the second lever is movable in a second actuating direction, and the movement of the second lever in the second actuating direction moves the piston with respect to the cylinder, thereby forcing fluid through the fluid outlet, wherein movement of the second lever in the second actuating direction only moves the piston and does not cause the cylinder to move.

2. The hydraulic assembly of claim 1, wherein the cylinder has a non-actuated position and a fully-actuated position, the cylinder is biased towards the non-actuated position, and the fluid containing region only has a single fluid outlet.

3. The hydraulic assembly of claim 1, further comprising: a hydraulic brake system in fluid communication with the cylinder, and wherein the fluid is forced through the fluid outlet and to the hydraulic brake system.

4. The hydraulic assembly of claim 1, wherein the first lever has a non-actuated position and a fully actuated position defining a reach between the non-actuated position and the fully actuated position, and the reach is adjustable.

5. A hydraulic assembly, comprising:
   a housing having a single open fluid outlet through which fluid can be forced during operation;
   a first lever, pivotally connected to the housing;
   a second lever, pivotally connected to the housing; and
   a volume of hydraulic fluid contained in the housing;
   wherein moving the first lever in a first actuating direction displaces hydraulic fluid from the housing through the single fluid outlet and moving the second lever in a second actuating direction displaces hydraulic fluid from the housing through the single fluid outlet.

6. The hydraulic assembly of claim 5, further comprising a first master piston operatively connected to the first lever, a second master piston operatively connected to the second lever, and a master cylinder disposed within the interior of the housing, wherein the volume of hydraulic fluid is contained within the master cylinder, moving the first lever in the first actuating direction displaces hydraulic fluid from the master cylinder, and moving the second lever in the second actuating direction displaces hydraulic fluid from the master cylinder.

7. The hydraulic assembly of claim 5, further comprising a master cylinder operatively connected to the first lever, wherein the volume of hydraulic fluid is contained within the master cylinder, moving the first lever in the first actuating direction displaces hydraulic fluid from the master cylinder through the single fluid outlet, and moving the second lever in the second actuating direction displaces hydraulic fluid from the master cylinder through the single fluid outlet.

8. The hydraulic assembly of claim 7, further comprising a master piston operatively connected to the second lever.

9. The hydraulic assembly of claim 8, wherein the master cylinder and the master piston define a fluid containing region, the volume of hydraulic fluid is contained in the fluid containing region, and moving at least one selected from the master piston and the master cylinder adjusts the volume of hydraulic fluid.

10. The hydraulic assembly of claim 8, wherein the master piston is disposed in the master cylinder.

11. The hydraulic assembly of claim 10, wherein moving the first lever in the first actuating direction moves the master cylinder in a first direction, and moving the second lever in the second actuating direction moves the master piston in a second direction.

12. The hydraulic assembly of claim 5, further comprising a hydraulic brake system in fluid communication with the housing.

13. A bicycle, comprising:
   a handlebar having a width defining a horizontal direction; and
   the hydraulic assembly of claim 5, wherein the hydraulic assembly is connected to the handlebar, and the first lever and the second lever are spaced apart from one another in a direction that is substantially perpendicular to the horizontal direction.

14. A brake assembly, comprising:
   first and second levers operatively connected to a single hydraulic brake system, wherein the first lever is operatively connected to a cylinder, and the second lever is operatively connected to a piston, wherein the piston is disposed in the cylinder, wherein the cylinder contains a volume of fluid and has a single fluid outlet in communication with the single hydraulic brake system, wherein movement of either the first or the second lever forces fluid through the single fluid outlet and to the single hydraulic brake system.

15. The brake assembly of claim 14, wherein moving the first lever moves the master cylinder with respect to the master piston.

16. The brake assembly of claim 14, wherein moving the second lever moves the master piston with respect to the master cylinder.

17. A hydraulic assembly, comprising:
   a master cylinder assembly containing a volume of hydraulic fluid and having a single open fluid outlet through which fluid can be forced during operation;
   a first lever operatively connected to the master cylinder assembly; and
   a second lever operatively connected to the master cylinder assembly;

wherein moving the first lever in a first actuating direction displaces hydraulic fluid from the master cylinder assembly through the single fluid outlet, and moving the second lever in a second actuating direction displaces hydraulic fluid from the master cylinder assembly through the single fluid outlet.

18. The hydraulic assembly of claim 17, wherein the master cylinder assembly comprises a master cylinder and a master piston.

19. The hydraulic assembly of claim 18, wherein the master cylinder and the master piston define a fluid containing region, and the volume of hydraulic fluid is contained in the fluid containing region.

20. The hydraulic assembly of claim 17, further comprising a single hydraulic brake system in fluid communication with the master cylinder assembly.

* * * * *